US005623656A

United States Patent [19]

Lyons

[11] Patent Number: 5,623,656
[45] Date of Patent: Apr. 22, 1997

[54] SCRIPT-BASED DATA COMMUNICATION SYSTEM AND METHOD UTILIZING STATE MEMORY

[75] Inventor: Kenneth B. Lyons, Lebanon, N.J.

[73] Assignee: Lucent Technologies Inc., Murray Hill, N.J.

[21] Appl. No.: 356,095

[22] Filed: Dec. 15, 1994

[51] Int. Cl.[6] .................................................. G06F 17/30
[52] U.S. Cl. ............... 395/610; 395/200.03; 395/200.09; 364/DIG. 1; 364/282.4
[58] Field of Search ......................... 395/200.03, 200.09, 395/600, 650, 700

[56] References Cited

U.S. PATENT DOCUMENTS

| 5,261,097 | 11/1993 | Saxon | 395/650 |
| 5,404,528 | 4/1995 | Mahajan | 395/650 |
| 5,448,739 | 9/1995 | Jacobson | 395/700 |
| 5,455,948 | 10/1995 | Poole et al. | 395/650 |

Primary Examiner—Wayne Amsbury
Assistant Examiner—John C. Loomis
Attorney, Agent, or Firm—Robert P. Marley

[57] ABSTRACT

A preprocessing script-based data communications system and method that embeds information regarding the previous state of the system within script data. This effectively imposes a state memory upon what would otherwise be a stateless system. Typically, the scripts processed by this system are similar in structure and format to ordinary HTML scripts, with the addition of several commands that facilitate programming embedded state information. Within systems employing the invention a client is afforded the capability of having one script influence another by exploiting the preprocessor imposed state memory. In addition, the invention provides these advantages to a client without the need for storing state information on a data system server, thereby providing increased system security.

11 Claims, 2 Drawing Sheets 5,623,656

SCRIPT-BASED DATA COMMUNICATION SYSTEM AND METHOD UTILIZING STATE MEMORY

TECHNICAL FIELD

The invention relates to digital data transmission and retrieval and, more particularly, to the processing of digital data to facilitate such.

BACKGROUND OF THE INVENTION

Within large-scale data networks, such as the Internet, typically many users or clients will have a need to receive data from and transmit data to a central server. To accommodate this exchange of data a series of communications called scripts are typically passed between the client computers and the central server. One particular type of script is based upon a software language known as hypertext mark-up language ("HTML"). This language facilitates the presentation of text at a client computer in a form contains formatting commands (i.e., "mark-up") that are interpreted by the client computer in order to present formatted screen. The latest version of MOSAIC (a copyrighted software package available from the National Center for Supercomputer Applications at the University of Illinois in Champagne, Ill.) provides a version of HTML that supports a Fill-In Form ("FIF") function where the client is provided with a text-based "form" in which he or she may fill-in the blanks. This "filled-in" information is then transmitted to the central server.

While systems employing HTML FIF provide for a very effective and easily understood means of communicating with a large number of clients via a network, they do have the limitation of being "stateless" systems. That is to say, within these systems, when a server or a client computer begins to process a received script or form, it has no information as to what that particular form is, exactly what information that form will carry, or what operations will be executed as a result of the receipt of that form. Such systems where a communication arrives at a terminal without a history are referred to as stateless—Making reference to the fact that the particular terminal or server that receives a script is in no particular state of preparedness when a given script arrives.

Since the names and structure of data fields are peculiar to a given form, and the recipient of that form is unable to anticipate the particular structure of a form prior to its receipt, it is generally necessary to create a separate executable program for each form, in order to process received data into a format that can be readily interpreted by a server. This being the case, any large scale use of forms would require a plethora of specialized programs to reside in the executable directory of any HTML FIF server. Together with other administrative headaches, this evokes a significant security concern as each of these executable programs would have to be checked for robustness from a security standpoint. As any security system is only as strong as its weakest link, if the number of executable programs is minimized, then the possibility of a security breach is also reduced, and resources could be concentrated upon insuring that the reduced number of programs were subjected to extensive testing and review.

SUMMARY OF THE INVENTION

The present invention overcomes the deficiencies of prior hypertext script-based data communication systems by preprocessing script-based data communications in a manner that embeds information regarding the previous state of the system within the script data. This effectively imposes a state memory upon what would otherwise be a stateless system. Typically, the scripts processed by this system are similar in structure and format to ordinary HTML scripts, with the addition of several commands that facilitate programming embedded state information. Within systems employing the invention a client is afforded the capability of having one script influence another by exploiting the preprocessor imposed state memory. In addition, the invention provides these advantages to a client without the need for storing state information on a data system server, thereby providing increased system security.

DETAILED DESCRIPTION OF THE INVENTION

Figure 1:
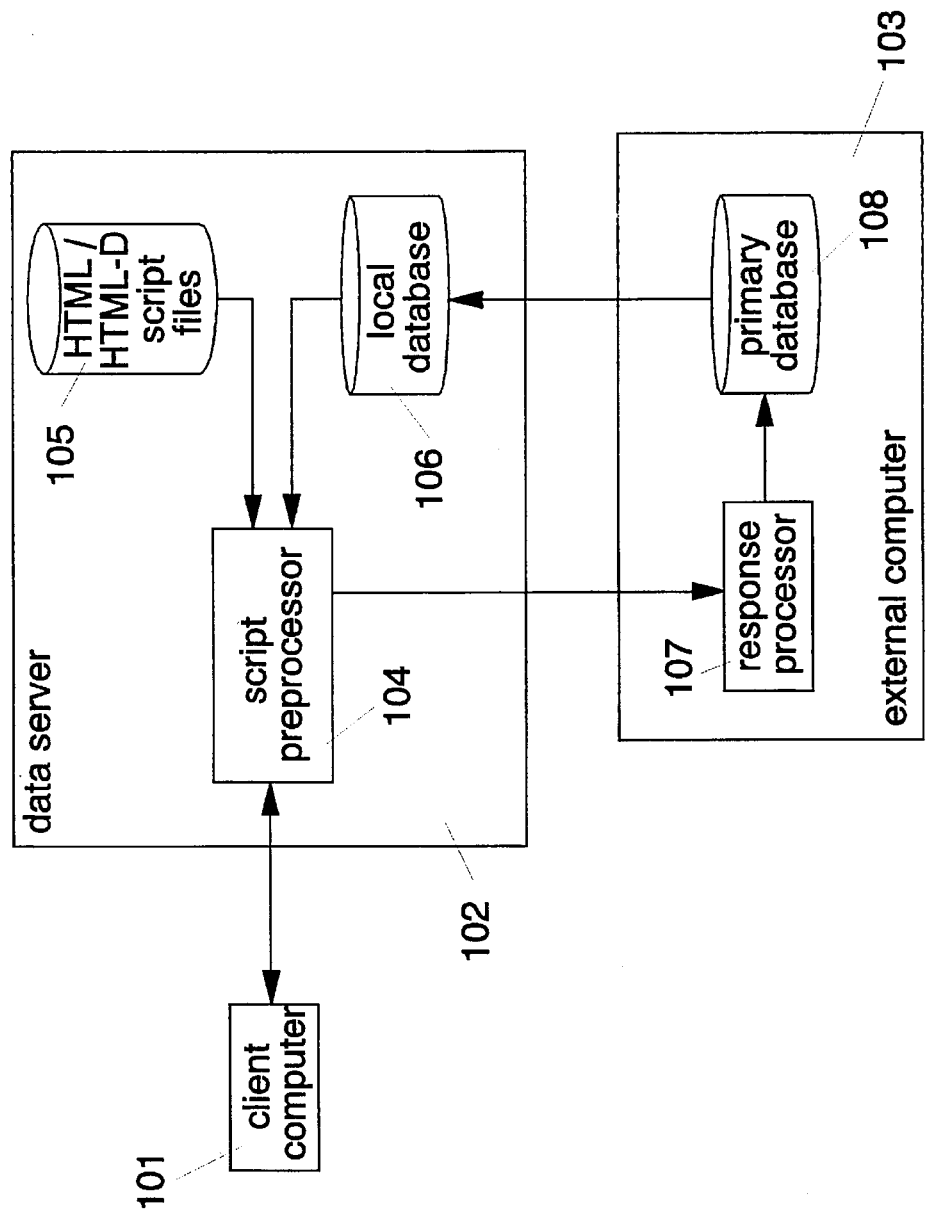
FIG. 1 is a simplified diagram of an exemplary data communication system facilitating the practice of the invention.

FIG. 1 shows a simplified diagram of an exemplary data communication system facilitating the practice of the invention. The system includes client computer 101, data server 102, and external computer 103. As shown data server 102 is comprised of script preprocessor 104, script file memory 105, and local database memory 106, and external computer 103 is comprised of response processor 107, and primary database 108. A client communicates with data server 102 via client computer 101. Client computer 101 can be any computer capable of executing HTML-compatible software (such as MOSAIC). As is typically the case for HTML database systems, when a communication within the system of FIG. 1 is initiated by a client this communication is initiated by a client, contacted data server 102 transmits an initial text-based FIF script file (retrieved from script file memory 105) to client computer 101. This script file appears to the client as an ordinary FIF form having specific blank fields that the client fills with appropriate alphanumeric information. Each data item representing the various filled-in form fields, along with an associated identifier, is then transmitted back to data server 102. The particular data structure employed to effect this transmission of data consists of an action parameter (which specifies the next script file to be transmitted to client computer 101 from data server 102) followed by a segmented block of input data (each segment reflecting the alphanumeric information entered into each particular field of the initial script). While to the client the data system of FIG. 1 appears to function no differently than a standard HTML data system, the filled-in field data transmitted from client computer 101 to data sever 102 is employed by script preprocessor 104 to define the state of the next script that will be passed to client terminal 101.

Script preprocessor 104 is shown to be linked to script file memory 105 and local data base memory 106. Script file memory 105, in addition to storing the initial textbased FIF script transmitted to client computer 101, also contains files that represent a finite set of text-based HTML FIF scripts that contain fields which are defined as a function of the filled-in field data transmitted from client computer 101.

These variable HTML FIF scripts are referred to as dynamic HTML ("HTML-D") scripts. Script preprocessor 104 is programmed to recognize the particular HTML-D script specified by the action parameter received from client computer 101. This retrieved HTML-D script is then processed by script preprocessor 104 as a function of the string of data blocks received from client computer 101 and pre-programmed instructions within script preprocessor 104. As a result, additional HTML-D scripts may be retrieved from script file memory 105 and transmitted to client computer 101, or if no further information is required from a client, the data transmission between client computer 101 and script processor 104 may be terminated.

The particular types of processing performed by script preprocessor 104 may be broadly categorized as text insertion, conditional text insertion, database record access, and conditional script redirection. Text insertion would result in the particular data block information being inserted into the HTML-D script that will be transmitted back to client computer 101. For example, if a client was instructed to fill in a particular field of the initial text-based FIF script with his or her name, and data representing this name was returned as a data block associated with an identifier "NAME," the NAME data could be inserted to appear in the next HTML script file that would be viewed by the client. Conditional text insertion is a process whereby simple text (i.e., text without embedded HTML mark-ups) may be inserted dependent upon comparison of text strings. For example, if the NAME variable data segment is left blank, a default segment (such as "Client" or "Subscriber") could be inserted. An example of the performance of database record access as a function of the same NAME variable would involve script preprocessor 104 comparing the received NAME data block to a particular list of NAME data stored in local database memory 106. If the received NAME data matched a name upon this stored list, a line of text providing a client with a particular message (e.g., "Your account is overdue", or other personalized information such as a phone number or address) would be inserted into the next HTML script file to be viewed by the named client. Finally, conditional script redirection is a process whereby a new HTML-D script file is conditionally substituted for the script file that was initially retrieved based on comparison of received data. For example, if the NAME data failed to match a stored listing of valid clients, script preprocessor 104 would redirect an HTML-D script facilitating client registration to client computer 101 (as opposed to displaying the usual HTML-D script that would be shown to a valid client).

As the above described HTML and HTML-D script processing is being performed, script preprocessor is collecting requested information from the data blocks received from client computer 101. In accordance with the programming of script preprocessor 104, all or part of this collected information is transmitted to response processor 107 within external computer 103. This transmission can take place on a real-time basis (as each data block is received by script processor 104), at the termination of a communication with a given client, or simply on a periodic basis. Response processor 107 is a data processor adapted to accept client-associated information and update primary database to reflect this information. This updated information is then transmitted from primary database 108 to local database 106. In this manner, the information in local database 106 my be kept current, and primary database 108 remains isolated from data server 102 (thereby providing an increased degree of security and data integrity protection).

As with transmissions from script processor 104 to response processor 107, information transmissions from primary database 108 to local database 106 can take place on a real-time basis, at the termination of a communication with a given client, or on a periodic basis.

Figure 2:
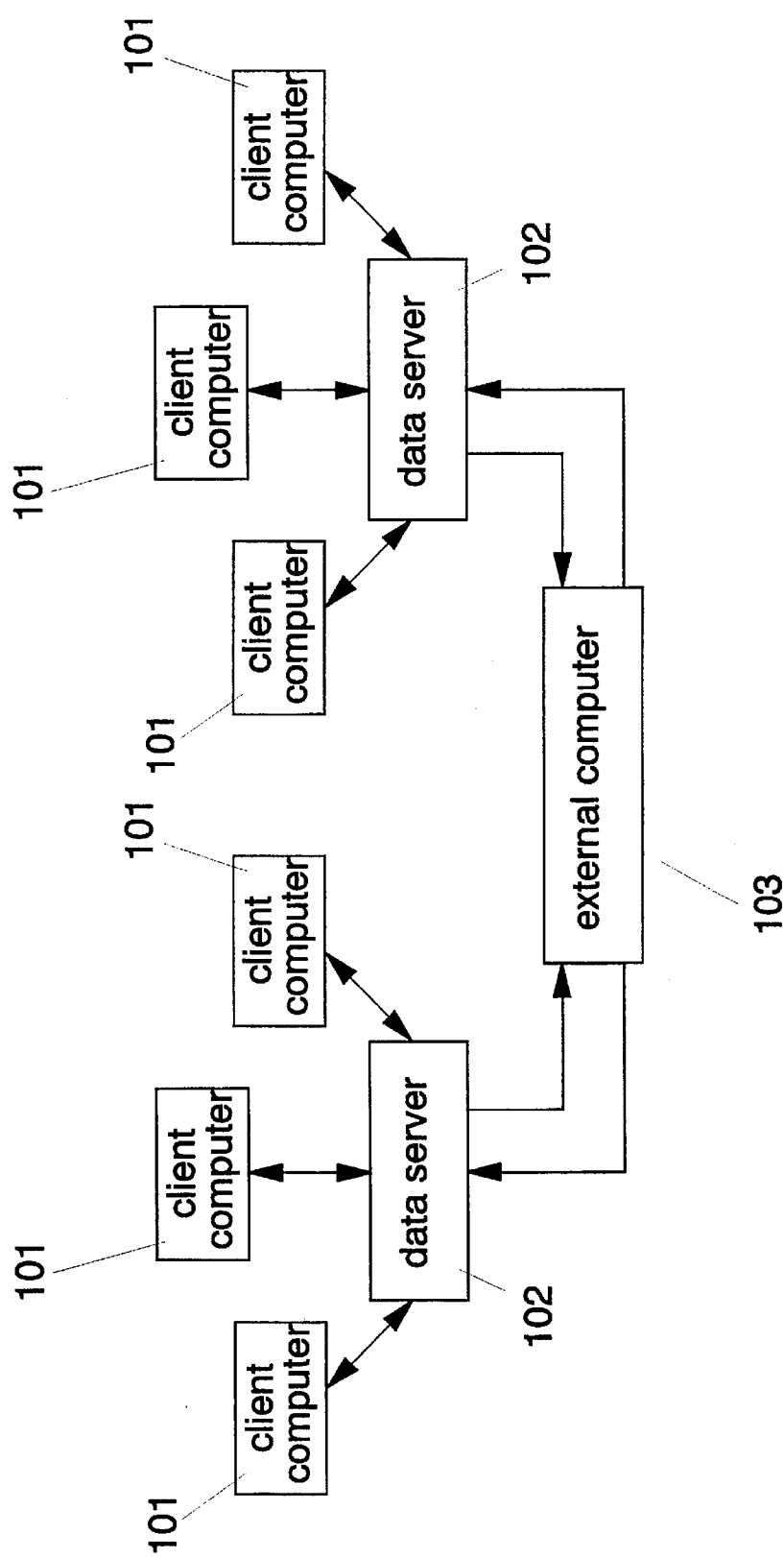
FIG. 2 is a simplified diagram depicting an alternate data communication system facilitating the practice of the invention.

It will be understood that the particular system and method described above is only illustrative of the principles of the present invention, and that various modifications could be made by those skilled in the art without departing from the scope and spirit of the present invention, which is limited only by the claims that follow. One modification would include applying the principles of the invention to a system where an external computer was linked to multiple data servers, and each of these multiple data servers facilitated communication with more than one client computer (see FIG. 2). Another modification would be applying the invention to systems employing script-based languages similar to HTML, and/or to systems where the data collected from clients included information other than alphanumeric characters (such as graphics or other digital data). Furthermore, it will be understood that text comparison employed in the above described embodiment is merely an example of variable manipulation that may performed in processing an HTML-D script, and that HTML-D script processing in response to any type of boolean manipulation that could be performed by a data processor is within the scope of this invention. In addition, the invention is not limited by any particular mode of information transmission between the various system components. Information can be passed between client computers, data servers, and external computers via hard-wired networks, wireless data links, switched data networks, public telephone lines, or any combination thereof.

I claim:

1. A method for performing data communications within a script-based system, comprising the steps of:

receiving script-based information containing embedded variables from a client node;

retrieving, in response to said received script-based information and the embedded variables contained therein, data representing at least one particular script file, and modifying said retrieved data as a function of said variables contained in said received script-based data;

transmitting said modified retrieved data to said client node, thereby providing said client node with information reflective of the previous state of a said script-based system.

2. The method of claim 1 wherein said received script-based information is hypertext mark-up language based information.

3. A method for performing script-based data communications, comprising the steps of:

receiving script-based information containing embedded variables from a client node;

retrieving, in response to said received script-based information and the embedded variables contained therein, data representing at least one particular script file, and modifying said retrieved data in response to variables contained in said received script-based data and other data retrieved from a local database;

transmitting said modified retrieved data to said client node, thereby providing said client node with information reflective of the previous state of a said script-based system.

4. The method of claim 3 further comprising the step of transmitting information related to said received script-based information to an external computer.

5. The method of claim 3 further comprising the step of modifying said retrieved data in response to information retrieved from an external computer.

6. A script-based data communication system comprising:

at least one client node adapted to receive and transmit script-based data; and a data server, including a script preprocessor and a script file memory, wherein said script preprocessor is configured to retrieve data representing particular script files from said script file memory; modify said retrieved data in response to variables contained in script-based data received from one or more client nodes; and transmit said modified retrieved data between said data server and said one or more client nodes, thereby providing said one or more client nodes with information reflective of the previous state of said script-based communication system.

7. The script-based data communication system of claim 6 wherein hypertext mark-up language based scripts are transmitted between said data server and said one or more client nodes.

8. A script-based data communication system comprising:

at least one client node adapted to receive and transmit script-based data;

a data server, including a script preprocessor, a script file memory and a database, wherein said script preprocessor is configured to retrieve data representing particular script files from said script file memory and modify said retrieved data in response to variables contained in script-based data received from one or more client nodes and data contained in said database; and transmit said modified retrieved data between said data server and said one or more client nodes, thereby providing said one or more client nodes with information reflective of the previous state of said script-based communication system.

9. The script-based data communication system of claim 8 wherein hypertext mark-up language based scripts are transmitted between said data server and said one or more client nodes.

10. The script-based data communication system of claim 8, further comprising:

a data communication link between said data server and an external computer, said communication link being adapted to facilitate the transmission of information from said data server to said external computer.

11. The script-based data communication system of claim 8, further comprising:

a data communication link between said data server and an external computer, said communication link being adapted to facilitate the transmission of information from said data server to said external computer, and the transmission of information from said external computer to data server and said data base.

\* \* \* \* \*